(12) United States Patent
Aoki et al.

(10) Patent No.: US 12,506,184 B2
(45) Date of Patent: Dec. 23, 2025

(54) BATTERY PACK

(71) Applicant: DENSO CORPORATION, Kariya (JP)

(72) Inventors: Kousuke Aoki, Kariya (JP); Tatsuhiro Numata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/239,803

(22) Filed: Aug. 30, 2023

(65) Prior Publication Data

US 2023/0411707 A1 Dec. 21, 2023

Related U.S. Application Data

(62) Division of application No. 17/143,613, filed on Jan. 7, 2021, now Pat. No. 11,784,357.

(30) Foreign Application Priority Data

Jan. 15, 2020 (JP) .................. 2020-004388

(51) Int. Cl.
*H01M 10/42* (2006.01)
*H01M 10/48* (2006.01)
*H01M 50/204* (2021.01)
*H01M 50/233* (2021.01)
*H01M 50/287* (2021.01)
*H01Q 1/22* (2006.01)
(Continued)

(52) U.S. Cl.
CPC ....... *H01M 10/425* (2013.01); *H01M 10/482* (2013.01); *H01M 50/204* (2021.01); *H01M 50/233* (2021.01); *H01M 50/287* (2021.01); *H01Q 1/2291* (2013.01); *H01Q 1/243* (2013.01); *H01Q 9/0407* (2013.01); *H01M 2010/4271* (2013.01); *H01M 2010/4278* (2013.01)

(58) Field of Classification Search
CPC .. H01M 10/425; H01M 10/482; H01M 10/48; H01M 50/287; H01M 50/204; H01M 50/233
See application file for complete search history.

(56) References Cited

U.S. PATENT DOCUMENTS

2009/0130530 A1 5/2009 Tanaka
2013/0130070 A1 5/2013 Adachi et al.
2016/0056510 A1 2/2016 Takeuchi et al.
(Continued)

FOREIGN PATENT DOCUMENTS

DE 10 2017 204 138 A1 9/2018
JP 2010-142083 A 6/2010
(Continued)

*Primary Examiner* — Basia A Ridley
*Assistant Examiner* — Jonathan William Estes
(74) *Attorney, Agent, or Firm* — Oliff PLC

(57) ABSTRACT

In a battery pack having a housing, battery modules composed of a plurality of battery cells, acquisition units equipped with slave antennas, and a monitoring device equipped with a parent antenna, the monitoring device and the acquisition units perform wireless communication to obtain battery information such as a state of change of each battery cell. A radio wave absorption part is formed on at least one of surfaces of the housing and an inside part of the housing. The radio wave absorption part absorbs a part of radio waves emitted from the parent antenna and the slave antennas.

31 Claims, 8 Drawing Sheets

(51) Int. Cl.
*H01Q 1/24* (2006.01)
*H01Q 9/04* (2006.01)

(56) References Cited

U.S. PATENT DOCUMENTS

| | | | |
|---|---|---|---|
| 2019/0242949 A1* | 8/2019 | Lemkin | ................ H01M 10/42 |
| 2019/0280264 A1 | 9/2019 | Kuruma | |
| 2020/0006815 A1* | 1/2020 | Hwang | ............... H01M 50/276 |
| 2021/0218071 A1 | 7/2021 | Aoki et al. | |

FOREIGN PATENT DOCUMENTS

| | | | | |
|---|---|---|---|---|
| JP | 2013-097883 A | 5/2013 | | |
| JP | 6228552 B2 | 11/2017 | | |
| JP | 2018-133152 A | 8/2018 | | |
| WO | WO-2018005631 A1 * | 1/2018 | ............... | H04Q 9/00 |
| WO | WO-2019059568 A1 * | 3/2019 | ............. | H01Q 17/00 |

* cited by examiner

(COMPARATIVE EXAMPLE)

BATTERY PACK

CROSS-REFERENCE TO RELATED APPLICATION

This application is a divisional application of U.S. patent application Ser. No. 17/143,613 filed on Jan. 7, 2021, which his related to and claims priority from Japanese Patent Application No. 2020-004388 filed on Jan. 15, 2020. The contents of each above listed application are hereby incorporated by reference.

TECHNICAL FIELD

The present disclosure relates to battery packs having a plurality of battery modules.

BACKGROUND

There is a battery pack having a housing, a plurality of battery modules, a plurality of acquisition units and a monitoring device. The plurality of battery modules, the plurality of acquisition units or communication units and the monitoring device are arranged in the housing. The acquisition units are provided to the corresponding battery packs to detect battery information. The monitoring device performs wireless communication with the acquisition units to receive the battery information transmitted from the acquisition units.

Each of the monitoring device and the acquisition units is equipped with a wireless communication antenna. Each wireless communication antenna emits radio waves. The emitted radio waves are reflected by the inner walls of the housing. The reflection of the emitted radio waves generates a plurality of reflected radio waves, and the reflected radio waves are superimposed on each other. This causes radio wave interference, and loss of wireless communication and wireless communication accident may occur due to radio wave interference.

Because level of risk of wireless communication failure risk scale varies due to communication frequency, the monitoring device changes the communication frequency when loss of wireless communication and wireless communication accident occurs at a communication frequency. There is a technique which changes a communication frequency used in wireless communication when a communication failure thereof occurs.

This technique may perform the wireless communication with other units by changing the communication frequency. However, it is difficult for this technique to reduce occurrence of wireless communication failure and to avoid loss of wireless communication from occurring. Frequent occurrence of loss of wireless communication and wireless communication accident often causes the monitoring device in a battery pack to change its communication frequency. The frequent occurrence of loss of wireless communication and wireless communication accident reduces the updating of battery information. It is accordingly difficult to apply the monitoring device having wireless communication function previously described to a battery pack requiring real-time wireless communication.

SUMMARY

It is desired for the present disclosure to provide a battery pack having a housing, a plurality of battery modules, a plurality of acquisition units, a monitoring device, a parent antenna, and a plurality of slave antennas. The battery modules are arranged in an inside of the housing. The acquisition units are arranged on the battery modules in one-to-one correspondence so as to acquire battery information of the battery modules. The monitoring device performs wireless communication with the acquisition units in the housing so as to acquire the battery information of the battery modules. The parent antenna is arranged on the monitoring device, and the slave antennas are arranged on the corresponding battery modules in one-to one correspondence, so as to perform the wireless communication between the monitoring device and the acquisition units. In particular, a radio wave absorption part is formed on at least one of surfaces of the housing and an inside of the housing. The radio wave absorption part absorbs radio waves emitted from the parent antenna and the slave antennas.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
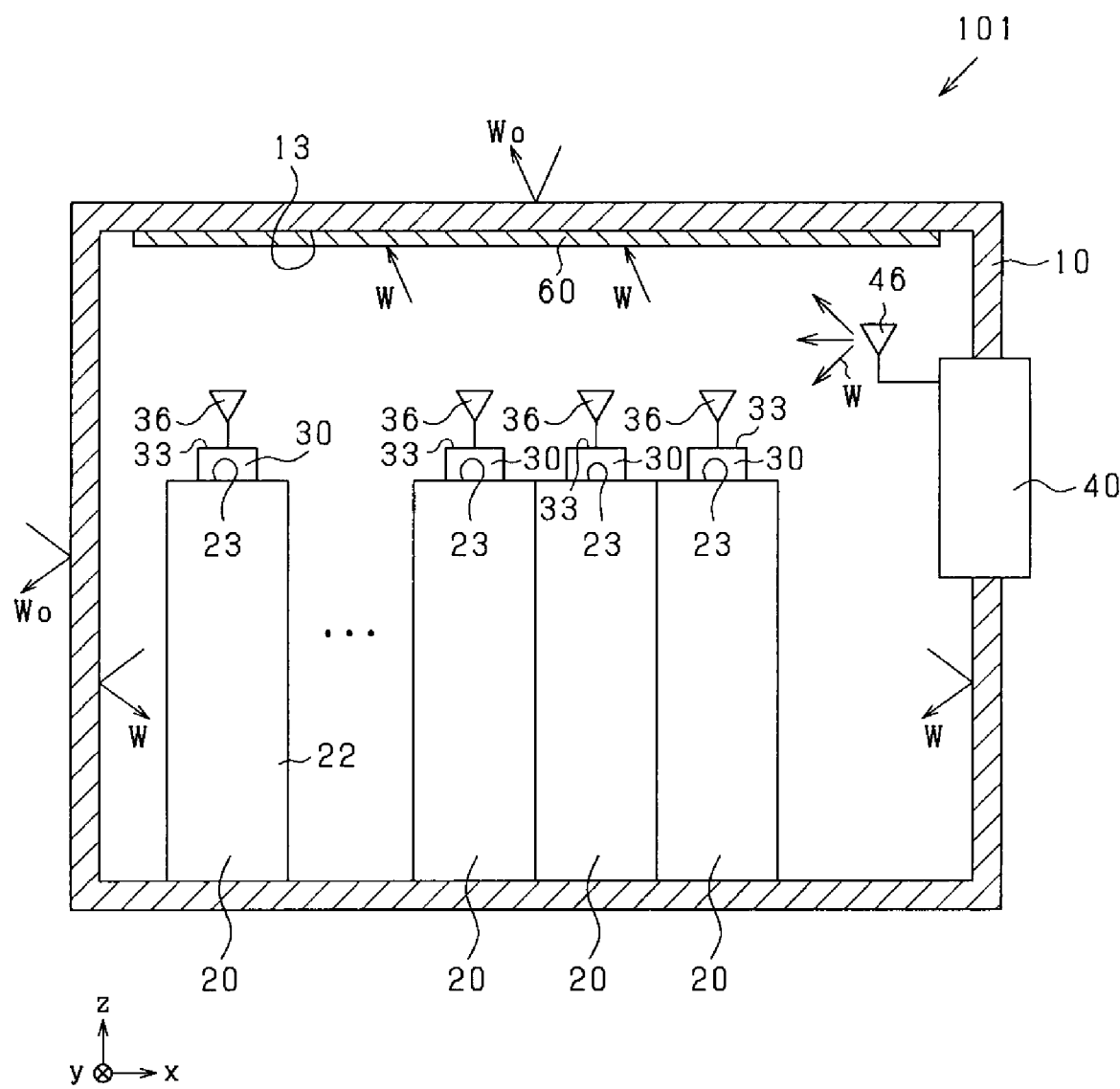
FIG. 1 is a view showing a front cross section of a battery pack according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a battery pack 101 according to a first exemplary embodiment of the present disclosure with reference to FIG. 1 to FIG. 3.

FIG. 1 is a view showing a front cross section of the battery pack 101 according to the first exemplary embodiment. The battery pack 101 may be mounted to motor vehicles, etc.

As shown in FIG. 1, the battery pack 101 has a housing 10, a plurality of battery modules 20 and acquisition units (or communication units) 30, and a monitoring device 40. The battery modules 20 and the acquisition units 30 are arranged in the housing 10. The acquisition units 30 and the monitoring device 40 form a battery monitor system capable of monitoring a state of each of the battery modules 20. The monitoring device 40 is composed of an electronic control unit (ECU).

The housing 10 is made of conductive material such as one made of metal. Outer surfaces of each of the battery modules 20, the acquisition units 30 and the monitoring device 40 are made of a conductive material such as one made of metal. Accordingly, the outer surfaces and the inner surfaces of the housing 10, the outer surfaces of each of the battery modules 20 and the acquisition units 30 reflect radio waves W. In other words, the outer surfaces and the inner surfaces of the housing 10, the outer surfaces of each of the battery modules 20 and the acquisition units 30 have a function of electromagnetic shielding.

In the following explanation with reference to FIG. 1 to FIG. 8, a lateral direction is designated by the reference character X, a longitudinal direction is designated by the reference character Y, and a vertical direction is designated by the reference character Z. It is acceptable to replace one of these directions with the other direction. In other words, it is acceptable to arrange the battery pack 101 in a desired direction.

As shown in FIG. 1, the plurality of battery modules 20 are arranged parallel with each other in the lateral direction X. Each of the battery modules 20 has a plurality of battery cells 22 arranged in the longitudinal direction Y. The plurality of battery cells 22 are electrically connected in series in each battery module 20.

Each acquisition unit 30 is arranged at each battery module 20. Specifically, each acquisition unit 30 is arranged at an upper surface 23 of the corresponding battery module 20. The acquisition unit 30 receives and acquires battery information regarding a state of the corresponding battery module 20. Such battery information includes voltage information, temperature information and current information of each battery cell 22 in the battery module 20. Each acquisition unit 30 is equipped with a slave antenna 36. Each slave antenna 36 projects upward from the upper surface of the corresponding acquisition unit 30. In other words, as shown in FIG. 1, each slave antenna 36 is arranged between the upper surface 33 of the acquisition unit 30 in the corresponding battery module 20 and a ceiling surface 13 of the housing 10.

As shown in FIG. 1, the monitoring device 40 composed of an electronic control unit (ECU) is arranged at a right-hand side wall of the housing 10, i.e. at the rightmost side in the lateral direction X. the part of the outer surface of the monitoring device 40 is exposed to the inside chamber of the housing 10. The battery modules 20 equipped with the acquisition units 30 and the slave antennas 36, and the monitoring device 40 equipped with the parent antenna 46 are arranged in the inside chamber of the housing 10. The monitoring device 40 communicates with an upper-level electronic control unit (upper-level ECU, not shown) by wireless communication or a wired communication. The monitoring device 40 has a parent antenna 46 to perform wireless communication with the respective slave antenna 36 mounted on each of the battery modules 20.

The monitoring device 40 performs the wireless communication to transmit an acquisition instruction to each of the acquisition units 30. The acquisition instruction instructs each acquisition unit 30 to acquire the battery information of its corresponding battery module 20, and to transmit the acquired battery information to the monitoring device 40. The monitoring device 40 generates an equalization instruction, and transmits it to the acquisition units 30 so as to equalize a voltage of each of the battery cells 22 in each battery module 20.

The housing 10 has a box shape so as to accommodate the parent antenna 46 and each of the slave antennas 36 in six directions which are in both sides of the lateral direction X, the longitudinal direction Y and the vertical direction Z. In other words, the housing 10 is arranged in the six directions of each of the parent antenna 46 and the slave antennas 36. It is accordingly acceptable for the housing 10 to have a screw hole, a vent hole and a connector hole, etc.

Hereinafter, radio waves emitted from the parent antenna 46 and radio waves emitted from each of the slave antennas 36 will be referred to as the direct radio waves. The direct radio waves are not reflected by the inner surfaces of the housing 10, the outer surfaces of the battery modules 20, etc. On the other hand, the radio waves which have been reflected by them will be referred to as the reflected waves.

In the housing 10 shown in FIG. 1, the parent antenna 46 is arranged at the battery module 20 located at the rightmost side in the lateral direction X and at the upper side of the upper surface 23 of the battery module 20. This arrangement of the parent antenna 46 allows emission of the direct radio waves to each of the slave antennas 36. In addition, it is also possible for each of the slave antennas 36 to perform emission of the direct radio waves to the parent antenna 46.

A gap between the upper surface 23 of each of the battery modules 20 and the ceiling surface 13 of the housing 10 in the vertical direction Z is narrow. Similarly, a gap between the upper surface 33 of each of the acquisition units 30 and the ceiling surface 13 of the housing 10 in the vertical direction Z is narrow, for example, each of these gaps in the vertical direction Z is not more than 3 cm, not more than 2 cm, or not more than 1 cm. For this reason, as shown in FIG. 1, a radio wave absorption part 60 made of a radio wave absorber is arranged on the ceiling surface 13 of the housing 10.

For example, it is acceptable to use as the radio wave absorber a powder-type absorber or a liquid-type absorber applied on the ceiling surface 13 of the housing 10. It is also acceptable to paste a sheet-type absorber on the ceiling surface 13 of the housing 10.

It is also acceptable to use the ceiling surface of the housing 10 made of a material capable of absorbing radio waves. It is also acceptable to use a ceiling surface of the housing 10 having a shape capable of absorbing radio waves. More specifically, it is possible to use, as the radio wave absorption part 60, conductive fibers, dielectric radiation absorbent material, or magnetic radio wave absorbent material, etc.

The battery pack 101 according to the first exemplary embodiment having the improved structure previously described has the following effects.

The improved structure of the battery pack 101 may reduce the overall size of the battery pack because each of the slave antennas 36 is arranged at a gap between the upper surface 33 of the corresponding acquisition unit 30 and the ceiling surface 13 of the housing 10.

Figure 2:
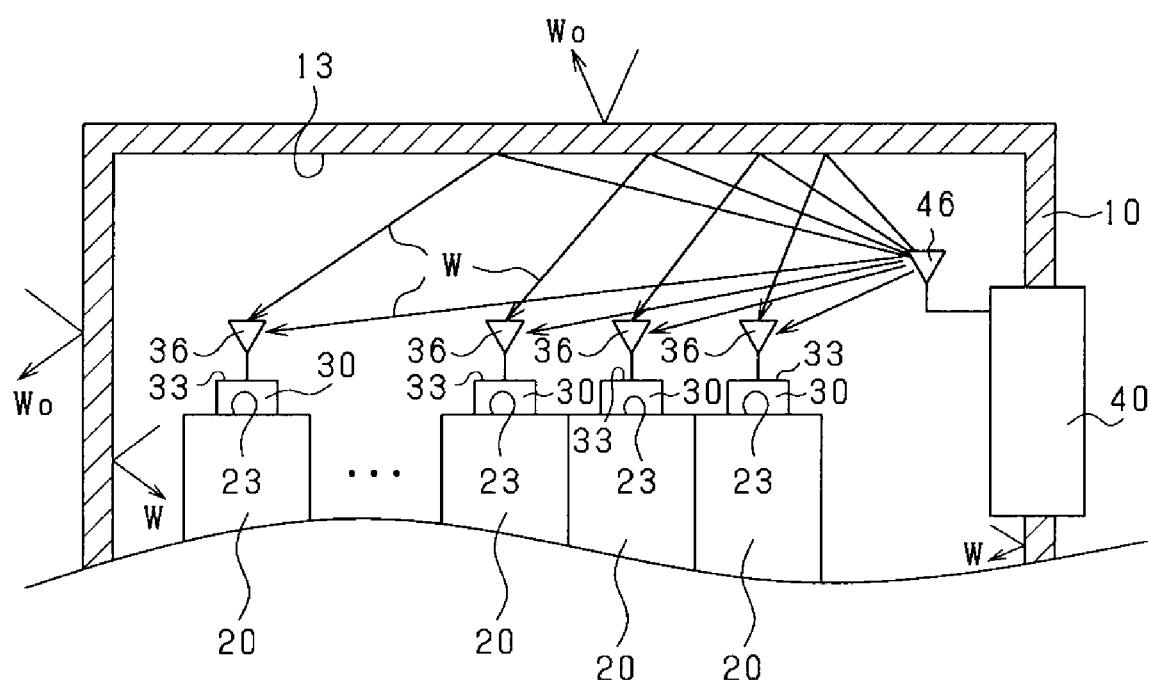
FIG. 2 is a view showing a front cross section of a battery pack according to a comparative example.

FIG. 2 is a view showing a front cross section of a battery pack according to a comparative example.

In the structure of the battery pack according to the comparative example shown in FIG. 2, no radio wave absorption part 60 is arranged on the ceiling surface 13 of the housing 10. That is, when the radio wave absorption part 60 is eliminated from the ceiling surface 13 of the housing 10, diffuse reflection of radio waves W often occurs at a gap between the upper surfaces 23 of the battery modules 20, the upper surfaces 33 of the acquisition units 30 and the ceiling surface 13 of the housing 10.

These upper surfaces 23 of the battery modules 20 and the upper surfaces 33 of the acquisition units 30 and the ceiling surface 13 of the housing 10 are made of conductive materials. Such conductive materials reflect radio waves W emitted from the slave antennas 36 and the parent antenna 46. In addition to this drawback, each of the battery pack shown in FIG. 2 and the battery pack 101 shown in FIG. 1 has a narrow gap between the ceiling surface 13 of the housing 10 and the upper surfaces 23 of the battery modules 20 and the upper surfaces 33 of the acquisition units 30. The reflected radio waves reflected by the upper surfaces 23 of the battery modules 20, the upper surfaces 33 of the acquisition units 30, etc. are superimposed together. That is, when the battery pack has no radio wave absorption part 60 and when the slave antennas 36 and the parent antenna 46 receive reflected radio waves which have been diffused in the narrow gap, wireless communication failure often occurs due to the reflected radio waves which are superimposed together at the slave antennas 36.

Figure 3:
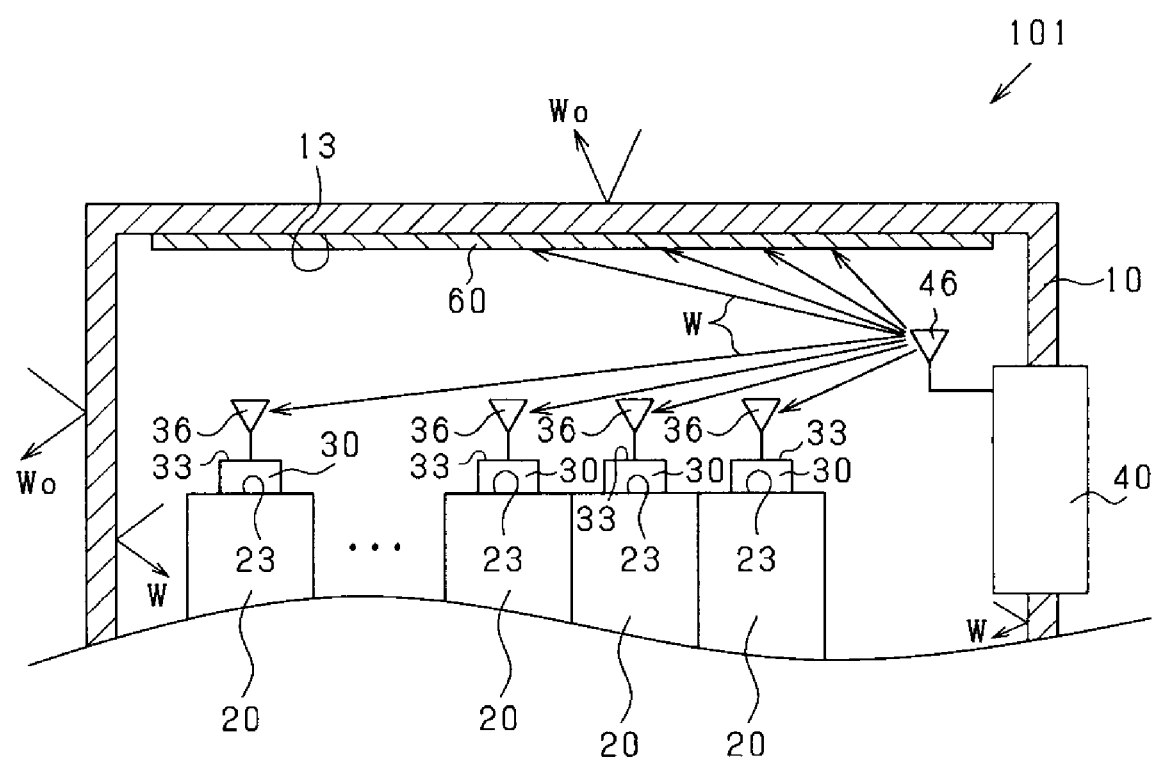
FIG. 3 is a view showing a front cross section of the battery pack according to the first exemplary embodiment shown in FIG. 1, which explains wireless communication in the inside of the battery pack.

FIG. 3 is a view showing a front cross section of the battery pack 101 according to the first exemplary embodiment shown in FIG. 1, which explains the wireless communication in the inside of the battery pack 101.

As shown in FIG. 3, because the battery pack 101 according to the first exemplary embodiment has the radio wave absorption part 60 formed on the ceiling surface 13 of the housing 10, the radio wave absorption part 60 absorbs these radio waves W arriving at the ceiling surface 13 of the housing 10. This improved structure of the battery pack 101 according to the first exemplary embodiment makes it possible to suppress a diffused reflection of radio waves in the narrow gap between the ceiling surface 13 of the housing 10 and the upper surfaces 23 of the battery modules 20 and the upper surfaces 33 of the acquisition units 30.

As previously described, it is possible for the battery pack 101 having the improved structure to reduce the overall size of the battery pack 101 and to suppress a communication failure from occurring.

The battery pack 101 according to the first exemplary embodiment has the housing made of conductive material such as one made of metal in which the radio wave absorption part 60 is arranged on the ceiling part 13 of the housing 10, and no radio wave absorption part 60 is arranged on the other surfaces, i.e. the inner side wall surfaces and the inner bottom surface of the housing 10. The radio waves are accordingly reflected by the inner side wall surfaces and the inner bottom surface of the housing 10. This structure makes it possible to prevent the radio waves W from being leaked to the outside of the housing 10. This structure makes it possible to improve and provide tight security regarding data information of the battery modules 20, etc. In addition, this structure of the battery pack 101 makes it possible to suppress leaked radio waves from influencing communication devices, etc. located around the battery pack 101.

Still further, this improved structure makes it possible to prevent external radio waves Wo from entering into the inside of the housing 10 because such external radio waves Wo are reflected by the outer surface of the housing 10. That is, this improved structure of the battery pack 101 makes it possible to prevent the external radio waves Wo from causing interference at the slave antennas 36 and the parent antenna 46. This makes it possible to suppress a communication failure from occurring due to the external radio waves Wo.

Second Exemplary Embodiment

A description will be given of a battery pack 102 according to the second exemplary embodiment of the present disclosure with reference to FIG. 4.

Figure 4:
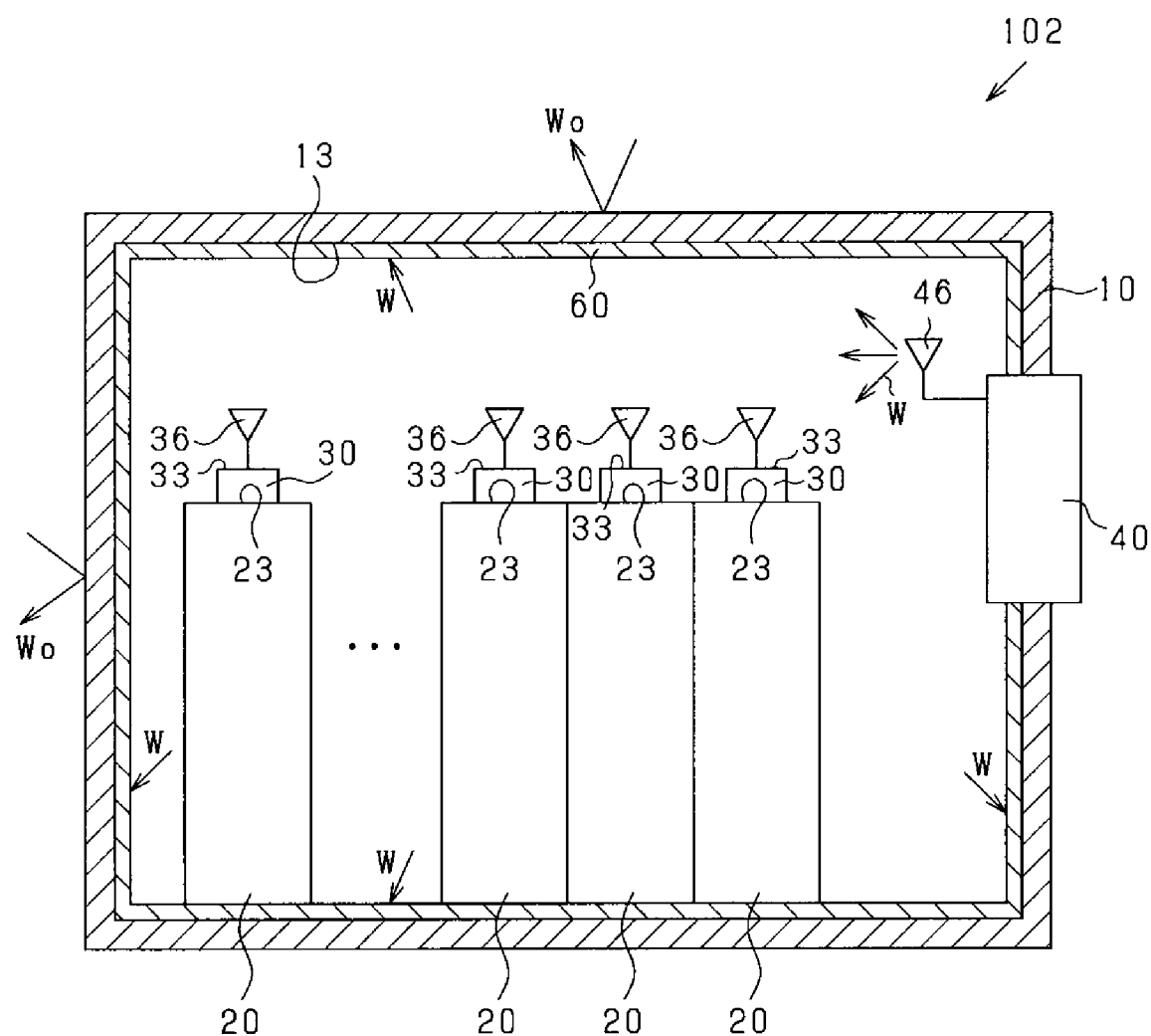
FIG. 4 is a view showing a front cross section of a battery pack according to a second exemplary embodiment of the present disclosure.

FIG. 4 is a view showing a front cross section of the battery pack 102 according to the second exemplary embodiment. The same components between the battery pack 102 according to the second exemplary embodiment shown in FIG. 1 and FIG. 3 and the battery pack 101 according to the first exemplary embodiment are referred to with the same reference numbers and characters. The explanation of the same components is omitted here for brevity.

In the structure of the battery pack 102 shown in FIG. 4, the radio wave absorption part 60 are arranged on the inner surfaces of the housing 10, i.e. on the ceiling surface 13, the inner side wall surfaces and the inner bottom surface. It is also acceptable to form a gap between the ceiling surface 13, the inner side wall surfaces and the inner bottom surface.

Because the battery pack 102 according to the second exemplary embodiment has the structure in which the radio wave absorption part 60 is arranged on the inner surfaces of the housing 10, this structure makes it possible to better suppress radio waves from being reflected on the inner surfaces of the housing 10, and to prevent wireless communication failure from occurring due to radio wave interference.

Third Exemplary Embodiment

A description will be given of a battery pack 103 according to the third exemplary embodiment of the present disclosure with reference to FIG. 5.

Figure 5:
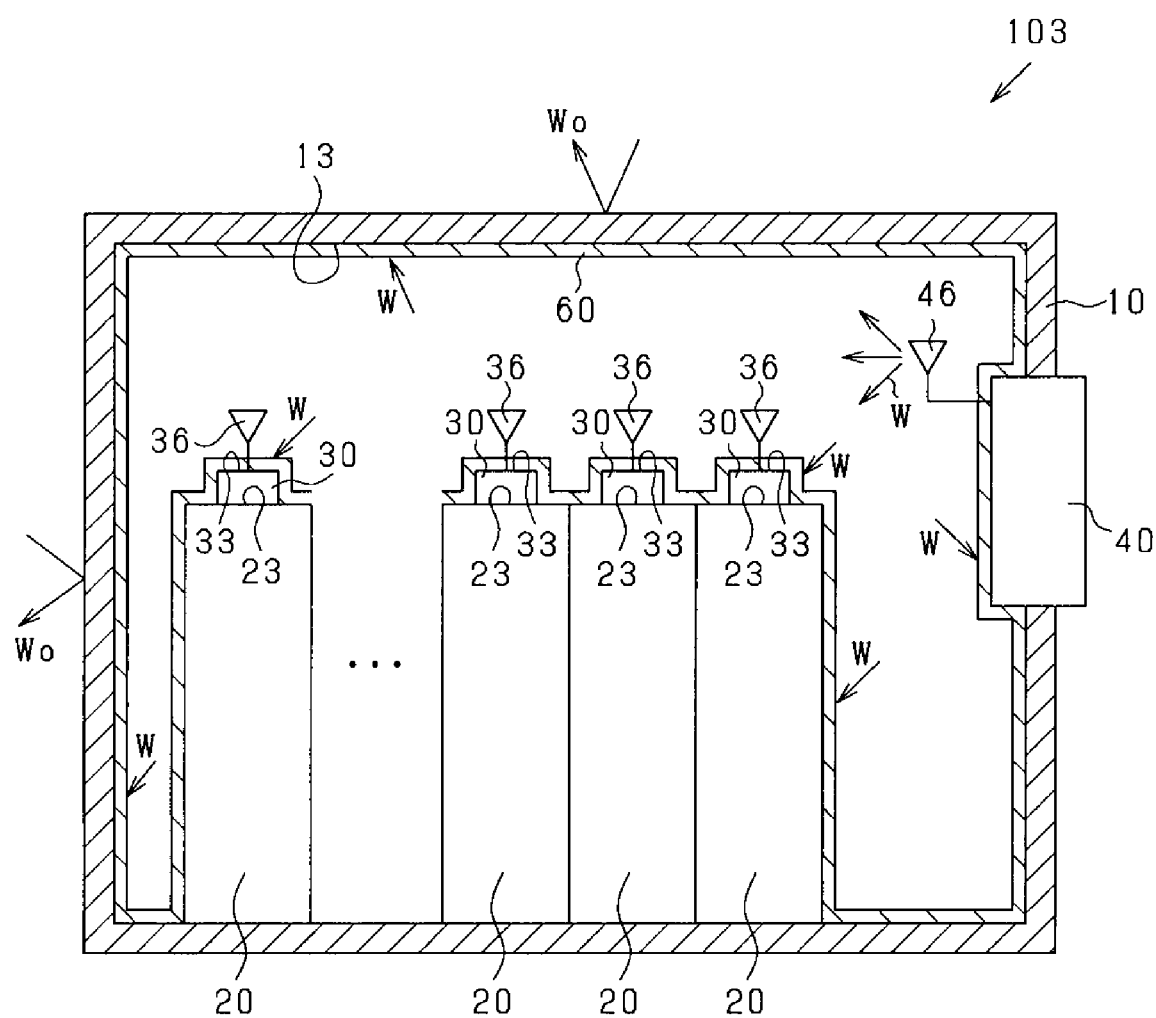
FIG. 5 is a view showing a front cross section of a battery pack according to a third exemplary embodiment of the present disclosure.

FIG. 5 is a view showing a front cross section of the battery pack 103 according to the third exemplary embodiment of the present disclosure. The same components between the battery pack 103 according to the third exemplary embodiment shown in FIG. 5 and the battery pack 101 according to the first exemplary embodiment shown in FIG. 1 and FIG. 3 are referred to with the same reference numbers and characters. The explanation of the same components is omitted here for brevity.

It is possible for the structure of the battery pack 103 according to the third exemplary embodiment to have the radio wave absorption part 60 formed on the ceiling surface 13, at least one outer surface of each of the battery modules 20, at least one outer surface of each of the acquisition units 30, and at least one outer surface of the monitoring device 40 which is exposed to the inside chamber of the housing 10.

Specifically, in the structure of the battery pack 103 shown in FIG. 5, the radio wave absorption part 60 is formed on the ceiling surface 13, at least one side surface of each of the battery modules 20, at least one outer upper surface of each of the acquisition units 30 and at least one outer surface of the monitoring device 40 facing the inside of the housing 10.

Because the battery pack 103 according to the third exemplary embodiment has the structure in which the radio wave absorption part 60 is arranged on the outer surfaces of each of the battery modules 20, each of the acquisition units 30 and the monitoring device 40, this structure makes it possible to more suppress radio waves from being reflected on the outer surfaces of each of the battery modules 20, each of the acquisition units 30 and the monitoring device 40. Further, this structure makes it possible to prevent wireless communication failure from occurring due to radio wave interference.

Fourth Exemplary Embodiment

A description will be given of a battery pack 104 according to the fourth exemplary embodiment of the present disclosure with reference to FIG. 6.

Figure 6:
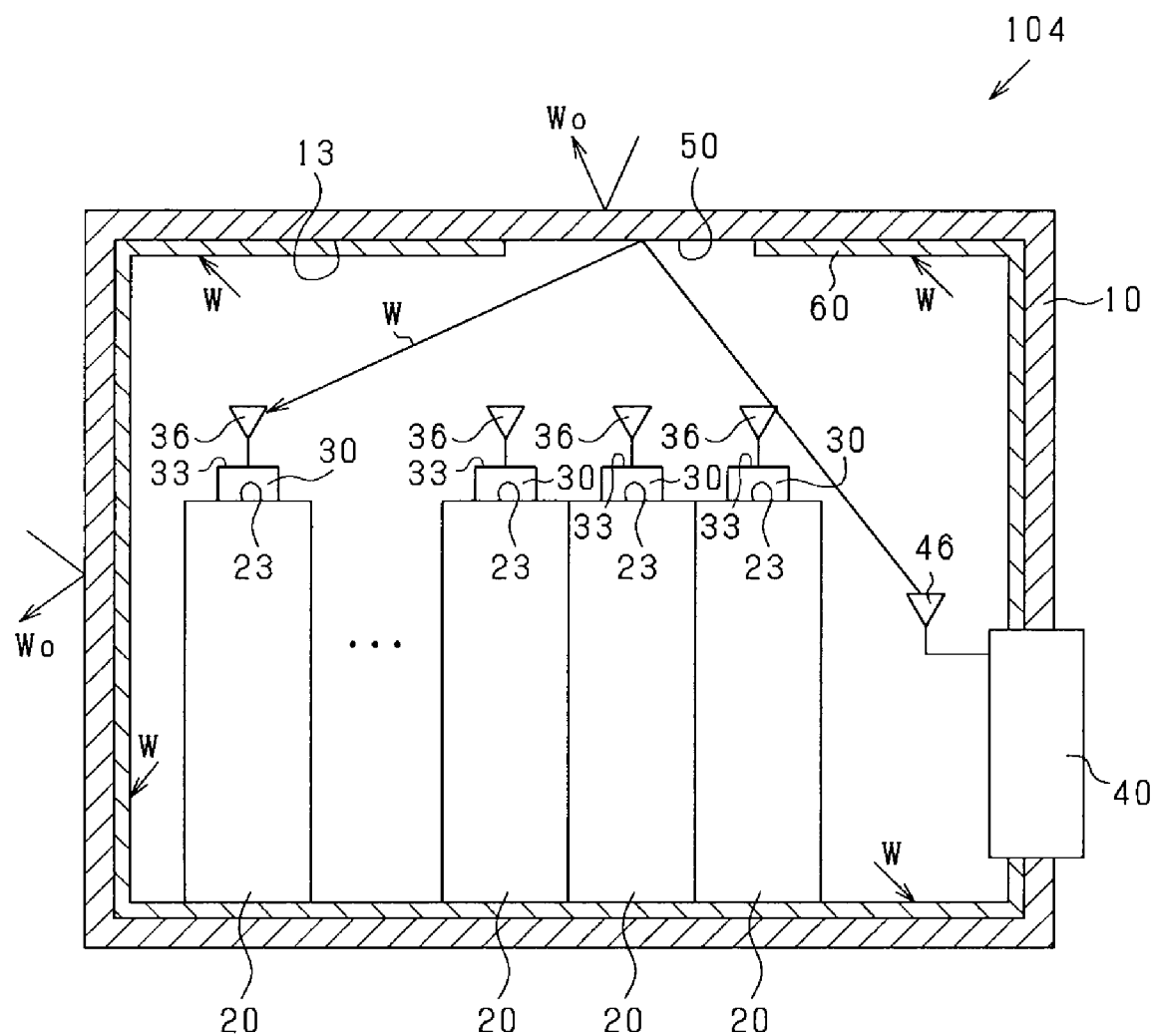
FIG. 6 is a view showing a front cross section of a battery pack according to a fourth exemplary embodiment of the present disclosure.

FIG. 6 is a view showing a front cross section of the battery pack 104 according to the fourth exemplary embodiment of the present disclosure. The same components between the battery pack 104 according to the fourth exemplary embodiment shown in FIG. 6 and the battery pack 101 according to the first exemplary embodiment shown in FIG. 1 and FIG. 3 are referred to with the same reference numbers and characters. The explanation of the same components is omitted here for brevity.

In the structure of the battery pack 104 according to the fourth exemplary embodiment shown in FIG. 6, the monitoring device 40 is more arranged at the right-hand side and the bottom surface side of the housing 10 when compared with the location of the monitoring device 40 according to the first exemplary embodiment shown in FIG. 1. Further, the parent antenna 46 is arranged at the right most side of the housing 10 and at the location which is lower in the vertical direction Z than the upper surface 23 of each of the battery modules 20. It is accordingly difficult for a direct radio wave (which is not a reflected radio wave) emitted from the parent antenna 46 to be transmitted to and reach the slave antenna 36 of the left-hand side battery module and the slave antennas 36 of the battery modules 20 located around the left-hand side battery module 36. Further, it is also difficult for direct radio waves (which have not been reflected) emitted from these slave antennas located at the leftmost side and peripheral locations of the leftmost side to be transmitted to and reach the parent antenna 46 of the monitoring device 40 located at the right-hand side of the housing 10.

In order to avoid this drawback, a reflection part 50 is arranged in the inside of the housing 10. The reflection part 50 reflects radio waves W emitted from the slave antennas 36 and the parent antenna 46. Radio waves emitted from the parent antenna 46 are reflected by the reflection part 50 located at the middle part of the ceiling surface of the housing 10. These reflected radio waves W may reach the slave antennas 36 of the battery modules 20 located at the leftmost side and around it. Similarly, the reflected radio waves W emitted from the battery modules 20 and reflected by the reflection part 50 may reach the parent antenna 46 of the monitoring device 40 shown in FIG. 6.

Specifically, as shown in FIG. 6, because the radio wave absorption part 60 is arranged on the ceiling surface 13 of the housing 10, excepting the location of the reflection part 50, the radio waves W emitted from the parent antenna 46 are reflected once by the reflection part 50, and the reflected radio waves W may reach the slave antennas 36 of the battery modules 20 located at the leftmost side and around it. Similarly, the radio waves W emitted from the slave antennas 36 of the battery modules located at the leftmost side and around it are reflected once by the reflection part 50, and the reflected radio waves W may reach the parent antenna 46 of the monitoring device 40.

The structure of the battery pack 104 according to the fourth exemplary embodiment makes it possible to perform radio wave communication because of having the reflection part 50 even if obstacles such as conductors are located between the parent antenna 46 and the slave antennas 36. This structure makes it possible to allow the parent antenna 46 and the slave antennas 36 to be arranged at desired locations in the housing 10, and also possible to allow the monitoring device 40 and the acquisition units 30 to be arranged at optional locations in the housing 10.

Still further, this structure of the battery pack 104 allows once-reflected radio waves which have been reflected once by the reflection part 50 to correctly reach the parent antenna 46 and the slave antennas 36. This structure makes it possible to provide stable radio wave communication transmit because of transmitting the strong radio waves to the parent antenna 46 and the slave antennas 36 when compared with a case in which multiple-reflected radio waves, which have been reflected more than several times, reach the parent antenna 46 and the slave antennas 36.

Furthermore, the reflection part 50 and the radio wave absorption part 60 are arranged on the ceiling surface 13 of the housing 10 in the battery pack 104 according to the fourth exemplary embodiment. This improved structure using the reflection part 50 and the radio wave absorption part 60 allows the reflection part 50 to be easily arranged on the reflection part 50 on the ceiling surface at the inside of the housing 10.

Fifth Exemplary Embodiment

A description will be given of a battery pack 105 according to the fifth exemplary embodiment of the present disclosure with reference to FIG. 7.

Figure 7:
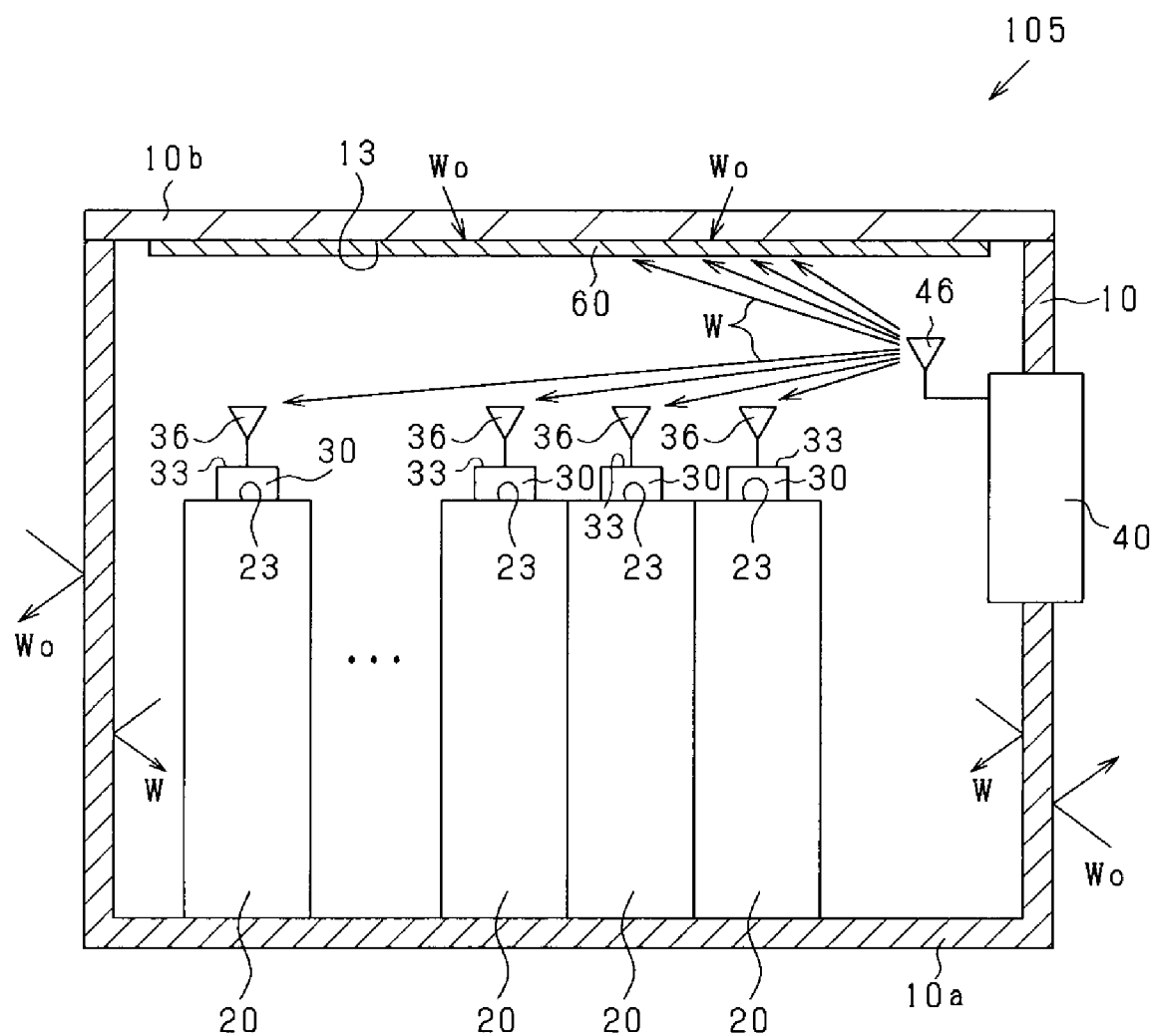
FIG. 7 is a view showing a front cross section of a battery pack according to a fifth exemplary embodiment of the present disclosure.

FIG. 7 is a view showing a front cross section of the battery pack 105 according to the fifth exemplary embodiment of the present disclosure. The same components between the battery pack 105 according to the fifth exemplary embodiment shown in FIG. 7 and the battery pack 101 according to the first exemplary embodiment shown in FIG. 1 and FIG. 3 are referred to with the same reference numbers and characters. The explanation of the same components is omitted here for brevity.

As shown in FIG. 7, the housing 10 has a main part 10a and a ceiling part 10b. The main part 10a has a box shape having an opening part which is open at the upper side thereof. The ceiling part 10b is fitted with the opening part of the main part 10a. The main part 10a is made of conductive material such as one made of metal. On the other hand, the ceiling part 10b is made of non-conductive material such as resin.

In the structure of the battery pack 105 according to the fifth exemplary embodiment shown in FIG. 7, the radio wave absorption part 60 is arranged on the bottom surface of the ceiling part 10b, which faces the inside chamber of the housing 10. That is, the parent antenna 46 and the slave antennas 36 are accommodated in the inside chamber formed by the main part 10a and the radio wave absorption part 60 in the housing 10. It is acceptable to form a gap between the radio wave absorption part 60 and the bottom surface of the main part 10a.

The structure of the battery pack 105 according to the fifth exemplary embodiment shown in FIG. 7 provides the following effects.

This structure of the battery pack 105 makes it possible to prevent radio waves W emitted from each of the parent antenna 46 and the slave antennas 36 from being leaked to outside of the housing 10 because the inner wall surfaces of the housing reflects the radio waves W. Further, this structure of the battery pack 105 makes it possible to prevent external radio waves from entering into the inside chamber of the housing 10 because the outer surfaces of the housing 10 reflect these external radio waves.

Although the ceiling part 10*b* made of non-conductive material such as resin allows radio waves to pass therethrough, the radio wave absorption part 60 arranged on the bottom surface of the ceiling part 10*b* absorbs external radio waves passing through the ceiling part 10*b* and the radio waves W emitted from the parent antenna 46 and the slave antennas 36. from entering into the inside chamber of the housing 10. In other words, the arrangement of the ceiling part 10*b* makes it possible to prevent the radio waves W emitted from the parent antenna 46 and the slave antennas 36 form being leaked to the outside of the housing 10, and to prevent the external radio waves Wo from entering into the inside chamber of the housing 10.

The arrangement of the radio wave absorption part 60 on the ceiling part 10*b* made of non-conductive material such as resin without any function of electromagnetic shielding makes it possible to prevent these radio waves W and Wo from being leaked outside and from entering into the inside chamber of the housing 10.

In particular, in the structure of the battery pack 105 according to the fifth exemplary embodiment shown in FIG. 7, because the parent antenna 46 and the slave antennas 36 are accommodated by the main part 10*a* made of conductive material and the radio wave absorption part 60 in the housing 10, the structure of the battery pack 105 makes it possible to prevent radio waves W from being leaked outside and external radio waves from entering into the inside chamber of the housing 10.

Sixth Exemplary Embodiment

A description will be given of a battery pack 106 according to the sixth exemplary embodiment of the present disclosure with reference to FIG. 8.

Figure 8:
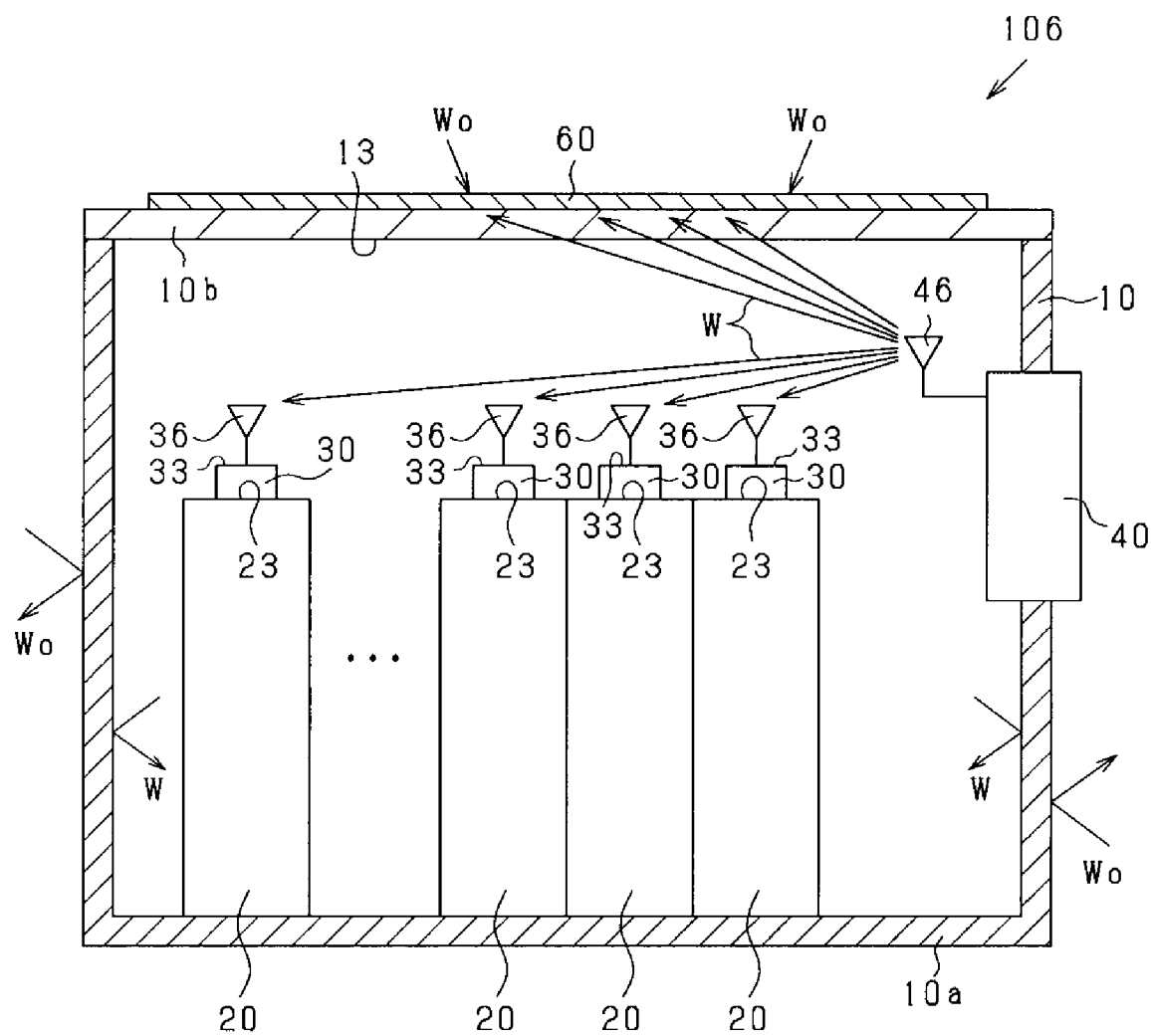
FIG. 8 is a view showing a front cross section of a battery pack according to a sixth exemplary embodiment of the present disclosure.

FIG. 8 is a view showing a front cross section of the battery pack 106 according to the sixth exemplary embodiment of the present disclosure. The same components between the battery pack 106 according to the sixth exemplary embodiment shown in FIG. 8 and the battery pack 105 according to the fifth exemplary embodiment shown in FIG. 7 are referred to with the same reference numbers and characters. The explanation of the same components is omitted here for brevity.

As shown in FIG. 8, the battery pack 106 according to the six exemplary embodiment has the radio wave absorption part 60 arranged on the upper surface of the ceiling part 10*b* made of non-conductive material such as resin. It is acceptable to arrange the radio wave absorption part 60 into the inside of the ceiling part 10*b*. In the structure of the battery pack 106 shown in FIG. 8, the radio wave absorption part 60 is arranged on the upper surface of the ceiling part 10*b*, exposed to the outside of the housing 10.

In the structure of the battery pack 106 according to the sixth exemplary embodiment shown in FIG. 8, because radio waves W emitted from the parent antenna 46 and the slave antennas 36 arranged in the housing 10 pass through the ceiling part 10*b* made of non-conductive material, it is not always necessary to arrange the radio wave absorption part 60 on the inner-side surface of the ceiling part 10*b*, which is exposed to the inside chamber of the housing 10, and it is possible to arrange the radio wave absorption part 60 on the upper surface of the ceiling part 10*b*, which is exposed to outside atmosphere of the housing 10. It is also acceptable to arrange the radio wave absorption part 60 in the inside of the ceiling part 10*b*, and for the radio wave absorption part 60 to be embedded into the inside of the ceiling part 10*b*. Even if radio wave absorption part 60 is arranged on the upper surface of the ceiling part 10*b* or embedded in the inside of the ceiling part 10*b*, the radio waves W emitted from the slave antennas 36 and the parent antennas 46 pass through the ceiling part 10*b* made of non-conductive material, and the radio wave absorption part 60 absorbs the radio waves W. This structure allows the radio wave absorption part 60 to be easily arrange at a desired location in the battery pack 106.

Other Modifications

The concept of the present disclosure is not limited by the structures according to the first to sixth exemplary embodiment previously described. For example, it is possible for the battery pack to have the following various modifications.

It is acceptable to arrange the radio wave absorption part 60 on at least the upper surface 33 of the acquisition unit 30, below each of the slave antennas 36, instead of or in addition to the radio wave absorption part 60 arranged on the ceiling surface 13 of the housing 10, above each of the slave antennas 36.

Further, it is acceptable to arrange the slave antenna 36 to the side wall surface of each of the radio wave absorption parts 60, and to arrange the radio wave absorption part 60 on the upper surface 23 of each of the battery modules 20, below its corresponding slave antenna 36.

Further, in the battery packs 101 to 103 according to the first to third exemplary embodiments, it is acceptable to use the housing 10 in which a part or the overall area thereof is made of non-conductive material. In this case, it is acceptable to arrange the radio wave absorption part 60 on the external surface of the ceiling part 10*b* made of non-conductive material or to embed the radio wave absorption part 60 into the inside of the ceiling part 10*b* made of non-conductive material such as resin.

When the housing 10 is made of non-conductive material, it is possible for the inner surfaces of the housing 10 to reflect no radio wave W. Even if the radio waves W, emitted from the parent antenna 46 and the slave antennas 36, pass through the housing 10 and are reflected by the outside conductive parts (not shown), it is possible for the arrangement of the radio wave absorption part 60 to prevent the radio waves W reflected by the outside conductive part from being superimposed on the slave antennas 36 and the parent antenna 46 arranged in the housing 10.

In the structure of the battery pack 104 according to the fourth exemplary embodiment shown in FIG. 6, it is acceptable to use a part of the housing 10 or the overall area of the housing 10 made of non-conductive material. When the ceiling part 13 is made of non-conductive material in the structure of the battery pack 104 according to the fourth exemplary embodiment shown in FIG. 6, the part of the ceiling part 13, in which no radio wave absorption part 60 is arranged, does not form the reflection part 50. In this case, it is necessary to arrange an additional conductive material part such as one made of metal on the ceiling part 13 which is made of non-conductive material so as to arrange the reflection part 50.

In the structure of each of the battery pack 105 according to the fifth exemplary embodiment shown in FIG. 7 and the battery pack 106 according to the sixth exemplary embodiment shown in FIG. 8, it is acceptable to use the main part 10*a* made of non-conductive material such as resin.

In the structure of each of the battery packs 101 to 106 according to the first to sixth exemplary embodiments shown in FIGS. 1, 3, and 4-8, it is acceptable to add the radio wave absorption part 60 onto a part without any radio wave absorption part.

It is possible to eliminate the radio wave absorption part 60 from a part including the radio wave absorption part 60.

As previously described, in the improved structure of the battery pack according to the present disclosure, the radio wave absorption part is arranged on the housing or embedded in the housing, and the radio wave absorption part absorbs a part of radio waves emitted from the parent antenna and the slave antennas. Accordingly, even if the housing is made of conductive material such as one made of metal, this structure of the battery pack makes it possible to suppress radio waves emitted from the parent antenna and the slave antennas from being reflected by the inner surface of the housing and from being superimposed on the parent antenna and the slave antennas. Further, even if the housing is made of non-conductive material such as resin, this structure of the battery pack makes it possible to suppress reflected radio waves from being superimposed on the parent antenna and the slave antennas, where the reflected radio waves have passed through the housing, and been reflected by an external conductive part located outside of the housing. This improved structure of the battery pack according to the present disclosure makes it possible to suppress wireless communication failure from occurring due to radio wave interference.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A battery pack comprising:
    a housing;
    a plurality of battery modules arranged in an inside of the housing;
    a plurality of acquisition units arranged on the plurality of battery modules in one-to-one correspondence so as to acquire battery information of the plurality of battery modules;
    a monitoring device performing wireless communication with the plurality of acquisition units in the housing so as to acquire battery information of the plurality of battery modules; and
    a parent antenna and slave antennas, the parent antenna being arranged on the monitoring device, and the slave antennas being arranged on the plurality of battery modules in one-to one correspondence, through which the monitoring device performs wireless communication to acquire the battery information of the battery modules,
    wherein
    the parent antenna of the monitoring device and at least one of the slave antennas are arranged at locations to which no direct radio waves, which have not been reflected, emitted from the parent antenna of the monitoring device and at least one of the slave antennas reach thereto, and
    a reflection part is arranged on the inside of the housing, the reflection part reflecting the radio waves so as (i) to allow the radio waves emitted from the parent antenna and reflected by the reflection part to reach the at least one slave antenna, and (ii) to allow the radio waves emitted from the slave antennas to reach the parent antenna of the monitoring device.

2. A battery pack comprising:
    a housing including a bottom surface and a ceiling surface opposed to the bottom surface;
    a plurality of battery modules arranged on the bottom surface inside the housing;
    a plurality of acquisition units arranged on the plurality of battery modules in one-to-one correspondence so as to acquire battery information of the plurality of battery modules;
    a monitoring device performing wireless communication with the plurality of acquisition units in the housing so as to acquire battery information of the plurality of battery modules; and
    a parent antenna and slave antennas, the parent antenna being arranged on the monitoring device, and the slave antennas being arranged on the plurality of battery modules in one-to one correspondence, through which the monitoring device performs wireless communication to acquire the battery information of the battery modules,
    wherein
    the parent antenna of the monitoring device and at least one of the slave antennas are arranged at locations to which no direct radio waves, which have not been reflected, emitted from the parent antenna of the monitoring device and at least one of the slave antennas reach thereto;
    the slave antennas are each arranged between an upper surface of each battery module and the ceiling surface;
    a distance between the ceiling surface and the upper surface is shorter than a distance between the upper surface and the bottom surface;
    an absorption part that absorbs radio waves is arranged between the upper surface and the ceiling surface; and
    the absorption part absorbs a part of the radio waves emitted from the parent antenna and the slave antennas.

3. A battery pack comprising:
    a housing including a bottom surface and a ceiling surface opposed to the bottom surface;
    a plurality of battery modules arranged on the bottom surface inside the housing;
    a plurality of acquisition units arranged on the plurality of battery modules in one-to-one correspondence so as to acquire battery information of the plurality of battery modules;
    a monitoring device performing wireless communication with the plurality of acquisition units so as to acquire battery information of the plurality of battery modules; and
    a parent antenna and slave antennas, the parent antenna being arranged on the monitoring device, and the slave antennas being arranged on the plurality of battery modules in one-to one correspondence, through which the monitoring device performs wireless communication to acquire the battery information of the battery modules,
    wherein
    the parent antenna of the monitoring device and at least one of the slave antennas are arranged at locations to which no direct radio waves, which have not been reflected, emitted from the parent antenna of the monitoring device and at least one of the slave antennas reach thereto;

the slave antennas are each arranged between an upper surface of each battery module and the ceiling surface;

a distance between the ceiling surface and the upper surface is shorter than a distance between the upper surface and the bottom surface;

an absorption part that absorbs radio waves is arranged between the upper surface and the ceiling surface; and the absorption part absorbs a part of the radio waves emitted from the parent antenna and the slave antennas.

4. The battery pack according to claim 1, wherein
the housing includes a bottom surface and a ceiling surface opposed to the bottom surface;

the plurality of battery modules are arranged on the bottom surface inside the housing;

the slave antennas are each arranged between an upper surface of each battery module and the ceiling surface;

a distance between the ceiling surface and the upper surface is shorter than a distance between the upper surface and the bottom surface;

an absorption part that absorbs radio waves is arranged between the upper surface and the ceiling surface; and the absorption part absorbs a part of the radio waves emitted from the parent antenna and the slave antennas.

5. The battery pack according to claim 1, wherein
the monitoring device is disposed between a side surface of one battery module of the plurality of battery modules and an inner surface of the housing;

a lower end of the monitoring device is positioned below an upper surface of the one battery module; and the parent antenna is positioned below the upper surface of the one battery module.

6. The battery pack according to claim 1, wherein
the monitoring device is disposed between a side surface of one battery module of the plurality of battery modules and an inner surface of the housing;

an upper end of the monitoring device is positioned below an upper surface of the one battery module; and the parent antenna is positioned below the upper surface of the one battery module.

7. The battery pack according to claim 1, wherein
the parent antenna is positioned between a side surface of one of the plurality of battery modules and an inner surface of the housing.

8. The battery pack according to claim 1, wherein
a conductor of one of the battery modules is positioned between the parent antenna and at least one of the slave antennas.

9. The battery pack according to claim 1, wherein
the monitoring device touches an inner surface of the housing, and the plurality of battery modules are provided between the monitoring device and the plurality of acquisition units.

10. The battery pack according to claim 1, wherein
the reflection part is disposed at a portion of the housing different from portions of the housing where the parent antenna and the slave antennas are positioned when viewing the monitoring device and the plurality of acquisition units in a vertical direction.

11. The battery pack according to claim 1, wherein
the monitoring device and the plurality of acquisition units are arranged side by side in a lateral direction of the battery pack.

12. The battery pack according to claim 1, wherein
a radio wave absorption part is provided on an inner surface of the housing where a first line connecting the parent antenna of the monitoring device and one slave antenna of the battery module crosses a second line orthogonal to the first line.

13. The battery pack according to claim 1, wherein
the plurality of battery modules are arranged between the parent antenna and the slave antennas.

14. The battery pack according to claim 2, wherein
the absorption part is arranged at a portion facing the parent antenna or the slave antennas.

15. The battery pack according to claim 1, wherein
the absorption part is arranged at a portion on the ceiling surface other than a predetermined portion on the ceiling surface; and the predetermined portion constitutes the reflection part.

16. The battery pack according to claim 15, wherein
the plurality of battery modules are arranged in a predetermined direction; and a length of the reflection part in the predetermined direction is longer than lengths of respective acquisition units.

17. The battery pack according to claim 1, wherein
the housing includes a bottom surface and a ceiling surface opposed to the bottom surface; and the parent antenna and the reflection part are positioned at mutually different positions in a vertical direction.

18. The battery pack according to claim 1, wherein
the housing includes a bottom surface and a ceiling surface opposed to the bottom surface; and the slave antennas and the reflection part are positioned at mutually different positions in a vertical direction.

19. The battery pack according to claim 1, wherein
respective slave antennas are provided protruding in a lateral direction of the acquisition units.

20. The battery pack according to claim 2, wherein
the plurality of battery modules are arranged in a predetermined direction;

the slave antennas and the parent antenna are positioned apart from each other in the predetermined direction; and the absorption part is arranged above the parent antenna.

21. The battery pack according to claim 20, wherein
the slave antennas and the parent antenna are arranged at different positions in a vertical direction.

22. The battery pack according to claim 2, wherein
the slave antennas and the parent antenna are arranged at different positions in a vertical direction; and the absorption part is arranged above the parent antenna.

23. The battery pack according to claim 2, wherein
the plurality of battery modules are arranged in a predetermined direction;

the slave antennas are arranged at positions shifted from a surface extending in a lateral direction through the parent antenna.

24. The battery pack according to claim 2, wherein
the parent antenna is arranged between the upper surface and the ceiling surface;

the absorption part is arranged at a portion overlapping with the parent antenna when the slave antennas are viewed from a vertical direction.

25. The battery pack according to claim 2, wherein
a number of the parent antenna is smaller than a number of the slave antennas.

26. The battery pack according to claim 2, wherein
a thickness of the absorption part is smaller than a thickness between an inner surface and an outer surface of the housing; and the absorption part is arranged at a portion facing the slave antennas.

27. The battery pack according to claim 2, wherein
the housing is provided with a side wall part extending from the bottom surface in a vertical direction;
the monitoring device is disposed at the side wall part; and
at least a part of the absorption part is arranged on the ceiling surface.

28. The battery pack according to claim 27, wherein
the absorption part is not arranged at the side wall part.

29. The battery pack according to claim 2, wherein
the absorption part is not arranged at an end portion of the ceiling surface in a lateral direction.

30. The battery pack according to claim 2, wherein
at least a part of portions where no absorption part is arranged in the housing is made of a conductive material.

31. The battery pack according to claim 2, wherein
at least a part of the monitoring device is positioned inside the housing.

* * * * *